Figure 1:
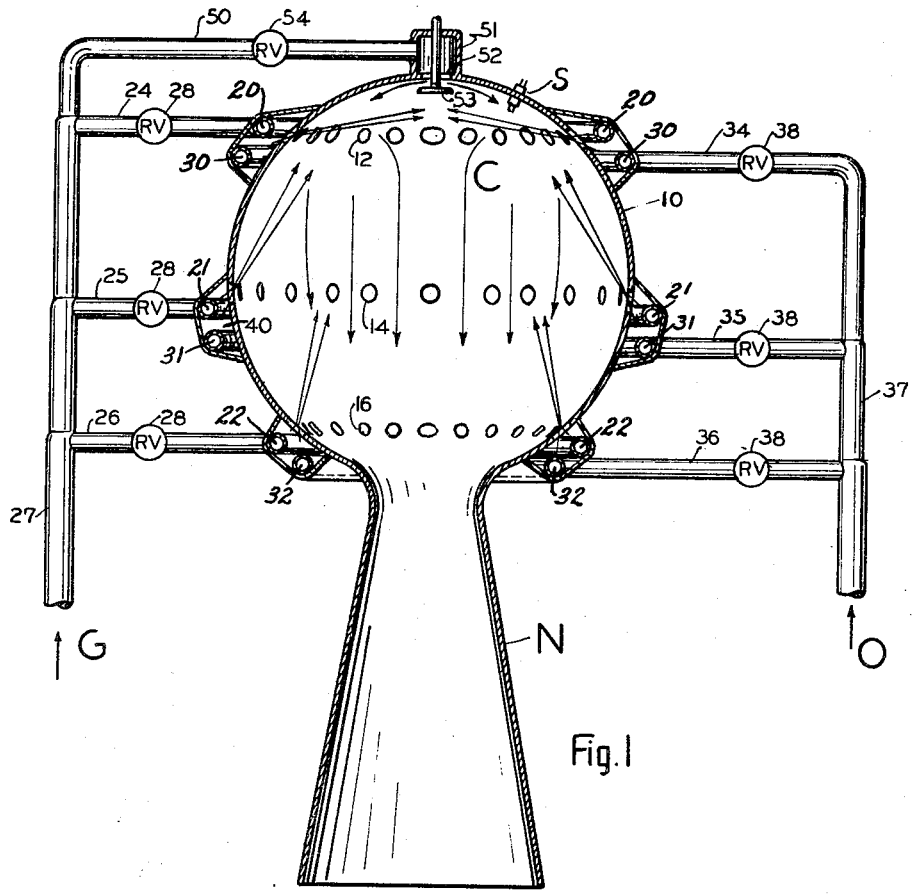

June 7, 1955

R. H. GODDARD 2,709,887

ZONAL SPRAY COMBUSTION CHAMBER
FOR ROCKETS AND ROCKET CRAFT
Filed May 25, 1950

INVENTOR.
ROBERT H. GODDARD, DEC'D.
ESTHER C. GODDARD, EXECUTRIX.
BY
Chas. T. Hawley
ATTY.

United States Patent Office 2,709,887
Patented June 7, 1955

2,709,887

ZONAL SPRAY COMBUSTION CHAMBER FOR ROCKETS AND ROCKET CRAFT

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application May 25, 1950, Serial No. 164,062

1 Claim. (Cl. 60—35.6)

This invention relates to combustion chambers having rearwardly-open discharge nozzles and as used in rockets and rocket craft.

It is the general object of this invention to provide improved devices for feeding combustion liquids to such a combustion chamber and in a plurality of zonal spray areas. Sprays of mixed combustion elements in each zonal area are directed toward the closed end of the combustion chamber and are preferably approximately tangential to the combustion chamber wall, for more effective cooling thereof.

A further object of the invention is to provide a combustion chamber of the defined type, in which the hot combustion gases travel a substantially axial path to the nozzle, and in which these hot gases are substantially spaced from the enclosing side wall of the combustion chamber.

Means is also provided for increasing the liquid pressure as the spray zones are more widely spaced from the closed end of the combustion chamber, whereby the rate of travel of the mixed liquid sprays toward the closed end of the chamber will be increased in proportion to the spacing of the spray zones from said closed end.

The invention further relates to arrangements and combinations of parts which will be hereinafter described and more particularly pointed out in the appended claim.

A preferred form of the invention is shown in the drawing, in which

Figure 2:
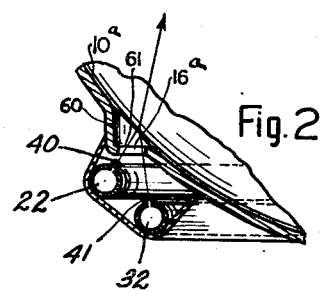

Fig. 1 is a sectional side elevation of a combustion chamber embodying this invention; and Fig. 2 is an enlarged fragmentary side elevation of a portion of the combustion chamber wall.

Referring to the drawing, a casing or wall 10 encloses a combustion chamber C having a rearwardly-open discharge nozzle N associated therewith. Annular series of ports 12, 14 and 16 are provided in the wall 10, and combustion liquids, as gasoline and liquid oxygen, are delivered to these ports by annular feed pipes 20, 21 and 22 for the gasoline and 30, 31 and 32 for the oxygen.

The gasoline feed pipes 20, 21 and 22 are connected by branch pipes 24, 25 and 26 to a supply pipe 27, and the flow through each branch pipe is controlled by a reducing valve 28. Similarly, the oxygen feed pipes 30, 31 and 32 are connected by branch pipes 34, 35 and 36 to a feed pipe 37 and the flow through each branch pipe is controlled by a reducing valve 38.

Spray nozzles 40 and 41 are provided on the gasoline feed pipes 20, 21 and 22 and on the oxygen feed pipes 30, 31 and 32 respectively, and these nozzles are so located that the sprays delivered thereby will converge and pass through the associated openings 12, 14 and 16 in the combustion chamber wall 10.

An additional branch pipe 50 connects the upper end of the gasoline feed pipe 37 to a casing 51 mounted above an axial feed opening 52 in the chamber wall 10. A spreader 53 diverts the gasoline tangentially as it enters the chamber C, and the rate of flow is controlled by a reducing valve 54.

By a selective setting of the reducing valves 28, 38 and 54, the feed pressures at the different nozzles may be proportioned to the distances of the spray zonal areas from the closed end of the combustion chamber, so that the sprays from all of the nozzles will take substantially the same time to reach the closed end of the chamber, where primary combustion takes place. A spark-plug S may be provided for starting combustion.

In Fig. 2, an enlarged portion of the wall $10^a$ in its preferred form is shown as having outwardly displaced annular wall portions 60 and 61 forming a peripheral ridge and as having ports, as $16^a$, formed in the wall portion 61, so that the sprays may be more effectively directed tangentially to the inner surface of the wall $10^a$.

With this arrangement of zonal sprays and graduated pressures, very complete intermingling of the combustion elements is attained, together with very complete combustion of the resultant mixture. Furthermore, the combustion gases pass out of the chamber C along an axial path quite widely spaced from the chamber wall 10, which arrangement permits a relatively thin chamber wall to be used without danger of overheating.

Having thus described the invention and the advantages thereof, it will be understood that the invention is not to be limited to the details herein disclosed, otherwise than as set forth in the claim, but what is claimed is:

A combustion chamber for rockets and rocket craft, said chamber having a substantially spherical chamber wall with a closed inner wall portion and with an open and outwardly expanding discharge nozzle continuously and unobstructedly connected to said chamber wall at the outer portion of said chamber, a plurality of sets of feeding ports in said combustion chamber wall, which sets of ports are disposed in a plurality of spaced parallel planes perpendicular to the combustion chamber axis, means to supply a mixed jet of liquid fuel and liquid oxidizer to each port and to direct one of said mixed jets through each of said ports, all of said jets being directed toward the closed inner portion of said combustion chamber and approximately tangential to the adjacent portion of the spherical wall of said chamber, and means to reduce the feeding pressure of each different set of nozzles in proportion to the distance of said set of nozzles from the closed end of the combustion chamber.

References Cited in the file of this patent

UNITED STATES PATENTS

| | | |
|---|---|---|
| 2,016,921 | Goddard | Oct. 5, 1935 |
| 2,217,649 | Goddard | Oct. 8, 1940 |
| 2,381,803 | Breault | Aug. 7, 1945 |
| 2,395,406 | Goddard | Feb. 26, 1946 |
| 2,417,445 | Pinkel | Mar. 18, 1947 |
| 2,482,260 | Goddard | Sept. 20, 1949 |
| 2,508,590 | Zucrow | May 23, 1950 |
| 2,510,571 | Goddard | June 6, 1950 |
| 2,526,223 | Goddard | Oct. 17, 1950 |
| 2,591,422 | Goddard | Apr. 1, 1952 |
| 2,606,421 | Goddard | Aug. 12, 1952 |
| 2,633,706 | Goddard | Apr. 7, 1953 |

OTHER REFERENCES

"Guided Missiles" (a compilation of Selected Guided Missile Articles that have appeared in Coast Artillery and Anti-aircraft Journal, 1946–1949) article by Willie Ley entitled "Rockets and Their Fuels," Part II. Page 32.